(12) United States Patent
Kim

(10) Patent No.: US 10,625,113 B2
(45) Date of Patent: Apr. 21, 2020

(54) UPPER LEG AND HIP EXERCISE METHOD AND DEVICE TO PRESERVE KNEE AND ANKLE JOINT WHILE EXERCISING

(71) Applicant: Eun Bee Kim, Chuncheon-si (KR)

(72) Inventor: Eun Bee Kim, Chuncheon-si (KR)

( * ) Notice: Subject to any disclaimer, the term of this patent is extended or adjusted under 35 U.S.C. 154(b) by 0 days.

(21) Appl. No.: 15/372,350

(22) Filed: Dec. 7, 2016

(65) Prior Publication Data
US 2018/0154206 A1 Jun. 7, 2018
US 2019/0336817 A9 Nov. 7, 2019

(30) Foreign Application Priority Data

Dec. 5, 2016 (KR) .................. 10-2016-0164260

(51) Int. Cl.
| | |
|---|---|
| A63B 22/00 | (2006.01) |
| A63B 21/062 | (2006.01) |
| A63B 21/00 | (2006.01) |
| A63B 21/055 | (2006.01) |
| A63B 21/22 | (2006.01) |
| A63B 22/06 | (2006.01) |
| A63B 23/04 | (2006.01) |
| B62M 1/36 | (2013.01) |
| B62M 9/02 | (2006.01) |
| B62M 1/24 | (2013.01) |

(52) U.S. Cl.
CPC ...... *A63B 22/0023* (2013.01); *A63B 21/0552* (2013.01); *A63B 21/0628* (2015.10); *A63B 21/22* (2013.01); *A63B 21/4034* (2015.10); *A63B 21/4035* (2015.10); *A63B 21/4039* (2015.10); *A63B 22/0046* (2013.01); *A63B 22/0605* (2013.01); *A63B 23/0476* (2013.01); *B62M 1/24* (2013.01); *B62M 1/36* (2013.01); *B62M 9/02* (2013.01)

(58) Field of Classification Search
CPC ............ A63B 21/4034; A63B 21/4039; A63B 22/0023; A63B 22/0605; A63B 22/0046; A63B 23/0476; A63B 21/0552; A63B 21/0628; A63B 21/22; A63B 21/4035; B62M 1/24; B62M 1/36; B62M 3/00; B62J 1/28
See application file for complete search history.

(56) References Cited

U.S. PATENT DOCUMENTS

| | | | | |
|---|---|---|---|---|
| 5,135,457 A | * | 8/1992 | Caruso ................. | A63B 23/085 482/100 |
| 5,672,143 A | * | 9/1997 | Ish, III ............... | A63B 23/0494 482/137 |
| 5,746,688 A | * | 5/1998 | Prager .............. | A63B 23/03533 482/130 |
| 8,801,640 B2 | * | 8/2014 | Sevy ................... | A63B 21/0442 482/131 |
| 9,950,210 B2 | * | 4/2018 | Meredith ............. | A63B 21/063 |

(Continued)

*Primary Examiner* — Megan Anderson

(57) ABSTRACT

Provided is an exercise device for performing exercises suitable to strengthen thigh and hip muscles such as a leg press machine, a total hip, a stationary bicycle, or a moving bicycle, and more particularly provides an exercise device for strengthening thigh and hip muscles while protecting the knees and ankle joints by enabling a user to locate a lower end of an arm on the user's thigh in a sitting or lying position and move the user's legs in order to minimize a load or stress added to the knee and ankle joints.

5 Claims, 13 Drawing Sheets

(56) References Cited

U.S. PATENT DOCUMENTS

| | | | |
|---|---|---|---|
| 2008/0182730 A1* | 7/2008 | Conley | A61H 1/0244 |
| | | | 482/95 |
| 2011/0300997 A1* | 12/2011 | Ilett | A63B 22/0007 |
| | | | 482/80 |
| 2011/0301002 A1* | 12/2011 | Sebastian | A63B 21/068 |
| | | | 482/140 |
| 2014/0094721 A1* | 4/2014 | Diallo | A61H 1/024 |
| | | | 601/5 |
| 2016/0346599 A1* | 12/2016 | Dalebout | A63B 22/06 |

* cited by examiner

UPPER LEG AND HIP EXERCISE METHOD AND DEVICE TO PRESERVE KNEE AND ANKLE JOINT WHILE EXERCISING

CROSS-REFERENCE TO RELATED APPLICATION

This application is based on and claims priority under 35 U.S.C. § 119 to Korean Patent Application No. 10-2016-0164260, filed on Dec. 5, 2016, in the Korean Intellectual Property Office, the disclosure of which is incorporated by reference herein in its entirety.

FIELD OF THE INVENTION

The present disclosure relates to an exercise method and an exercise device for performing exercises suitable to strengthen thigh and hip muscles while protecting the knees and ankle joints such as a leg press machine, a total hip, a stationary bicycle, or a moving bicycle, and more particularly, to an exercise method and an exercise device for strengthening thigh and hip muscles while protecting knee and angle joints by enabling a user to locate a lower end of an arm on his/her thighs in a sitting or lying position and move his/her legs.

To this end, the exercise device according to the present disclosure includes a seat configured to support the user in the sitting or lying position and the arm rotatably attached within a radius of 20 cm from the user's pelvis in a sagittal plane, wherein the end of the arm is configured to contact the user's thighs during use.

The exercise device according to an embodiment of the present disclosure includes various resistive force generators each configured to generate a resistive force against a force exerted by the user to rotate an arm portion. Also, the exercise device according to the present disclosure includes a shaft changing portion configured to allow the user to change a direction of an arm pivot axis. The exercise device according to another embodiment of the present disclosure includes two different pivot axis provided on one arm portion.

The exercise device according to another embodiment of the present disclosure includes two different arm shafts provided on one arm portion. In addition, the exercise device is applied to a bicycle so that the arm shaft of the arm portion is located on hip joints and an end of the arm is placed on the back of the thighs, and the exercise device propels the bicycle by rotating when the arm portion rotates clockwise and idling when the arm portion rotates counterclockwise to drive a rear wheel.

DESCRIPTION OF RELATED ART

Thigh and hip muscles account for more than a third of all muscles in our body. Building thigh and hip muscles may reduce the risk of diabetes, etc., may prevent obesity, and may promote health after middle age, and may also help to improve the physical fitness and sport ability of athletes.

However, exercises for strengthening thigh and hip muscles apply a load to ankle and knee joints, and thus knee osteoarthritis and chondromalacia are common among people who do strength training. Also, it is difficult for people with weak knees and ankle joints such as elders or obese people to perform exercises for strengthening thigh and hip muscles. Accordingly, there is a demand for an exercise device for training thigh and hip muscles without adding stress to the knees and joints. In general, a user performs an exercise for strengthening thigh and hip muscles by pulling his/her legs toward the chest and pushing them outward with the pelvis as an axis, as shown in FIG. 1. However, existing exercise methods and exercise devices may damage the knees and ankle joints because a load is directly transmitted to the ankles and knees, and thus it is not suitable for people with weak knees and ankle joints to use the existing exercise methods and exercise devices. Accordingly, the present disclosure is configured to reduce a force transmitted to the knees and ankles by enabling a user to locate a foot plate or a foot pad of an exercise machine connected to a weight on his/her thigh and pull his/her legs toward the chest and push them backward in a sitting, lying, or prone position.

When the exercise device according to an embodiment of the present disclosure is used, the user's thigh and hip muscles are all involved in lateral rotation and adduction as well as extension of the hip joints. Accordingly, the exercise machine according to an embodiment of the present disclosure includes a shaft changing portion configured to allow the user to change a direction of an arm shaft. The arm shaft may be rotatable in a direction in which the user's legs are extended. Also, the arm shaft may be movable in a direction in which the user's legs are adducted and laterally rotated. The exercise device according to another embodiment of the present disclosure includes two different arm shafts on one arm so that rotations about different axes are simultaneously performed and lateral rotation and adduction are simultaneously performed.

In addition, the exercise device according to another embodiment of the present invention includes a bicycle frame. In an existing bicycle, since a hip joint motion range is limited to a rotation diameter of a crank arm to which a pedal is attached, as shown in FIG. 2, the user's lower body is repeatedly moved only in a small space. Accordingly, when the exercise device is implemented as a bicycle an arm pivot axis of an arm is fixed to the user's hip joints, the exercise machine includes a propelling device for propelling the bicycle by rotating when the arm rotates clockwise and idling when the arm rotates counterclockwise to drive a rear wheel.

SUMMARY

In general, a user performs an exercise for strengthening thigh and hip muscles by pulling the legs toward the chest and pushing them outward with the pelvis as an axis, as shown in FIG. 1 Also, in a general bicycle, since a high hip motion range is limited to a rotation radius of a crank connected to a bicycle pedal, as shown in FIG. 2, the user's exercise is repeatedly performed only in a relatively small space when compared to the high hip motion range, and thus exercise efficiency in utilization of thigh and hip muscles is limited.

According to the present disclosure, an exercise method and an exercise device for strengthening thigh and hip muscles reduce a load applied to the legs by enabling a user to have a sitting, lying, or prone position during an exercise activity. Also, the exercise method and the exercise device minimize a load transmitted to the knees and ankle joints by enabling the user to move his/her legs after locating lower ends of arm portions on his/her thigh instead of the ankles or soles. The exercise method and the exercise device improve the exercise effect of strengthening thigh and hip muscles by increasing a hip joint motion range and a rotation axis.

DETAILED DESCRIPTION OF THE PREFERRED EMBODIMENTS

In the following description, well-known elements are not described in detail since they would obscure the invention with unnecessary detail. Various modifications and alternatives may be made in the present disclosure, and embodiments will herein be described in detail. It should be understood, however, that there is no intent to limit embodiments to the particular forms disclosed, but on the contrary, embodiments are to cover all modifications, equivalents, and alternatives falling within the scope of the present disclosure. The terminology used herein is for the purpose of describing embodiments only and is not intended to be limiting of embodiments. It will be further understood that the terms "comprises", "comprising", "includes", and/or "including", when used herein, specify the presence of stated features, integers, elements, components, and/or groups thereof but do not preclude the presence or addition of one or more other features, integers, elements, components, and/or groups thereof.

Embodiments of an exercise for strengthening thigh and hip muscles of the present disclosure for accomplishing the objectives will now be described with reference to the attached drawings.

Figure 1:
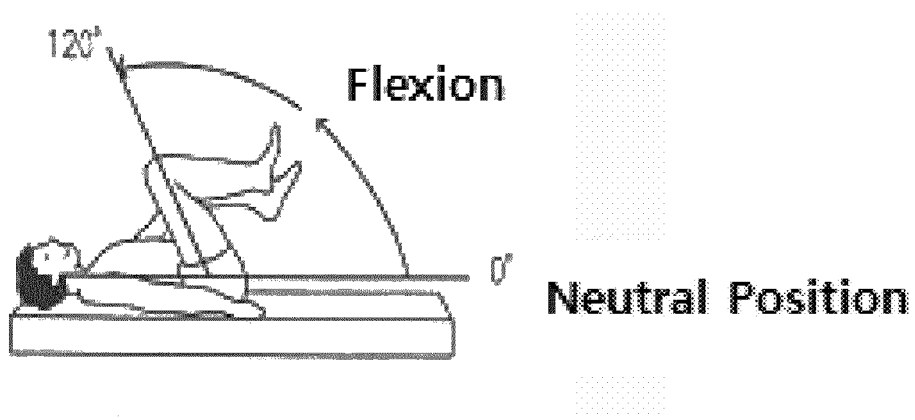
FIG. 1 is a view illustrating a general hip joint motion range in a sagittal plane.
Figure 2:
FIG. 2 is a view illustrating a motion range of a bicycle crank.
Figure 3:
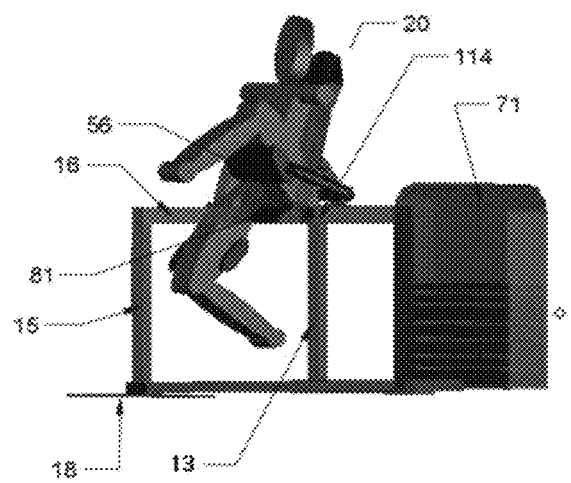
FIG. 3 is a view for describing an exercise device according to an embodiment of the present disclosure to which a load block is attached as a resistive force generator.
Figure 4:
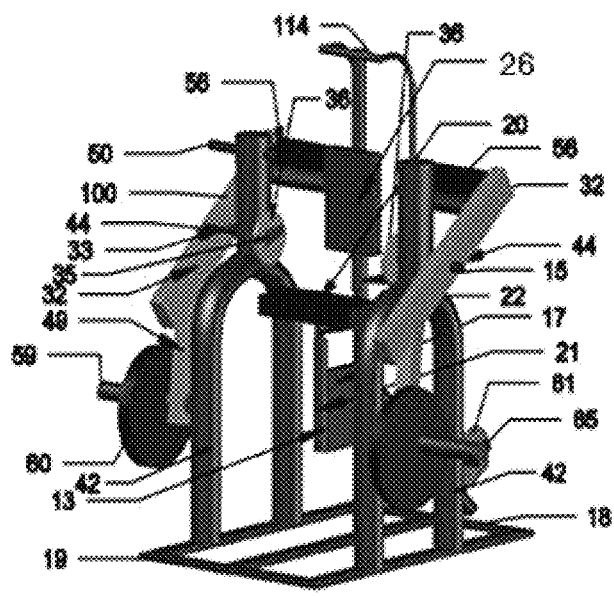
FIG. 4 is a perspective view of the exercise device according to an embodiment of the present disclosure to which a disk device is attached as a resistive force generator.
Figure 7:
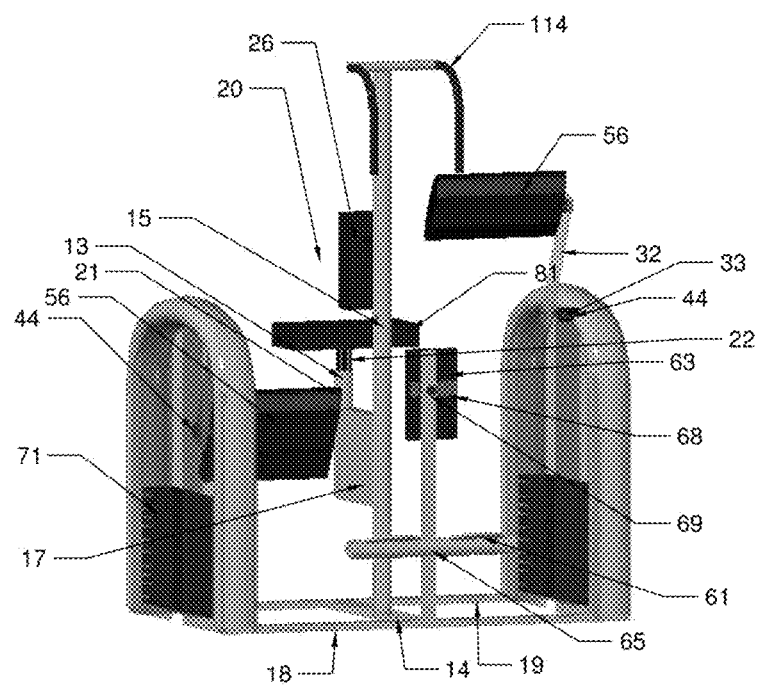
FIG. 7 is a view for describing the exercise device according to another embodiment of the present disclosure to which two sets of load blocks are attached as a resistive force generator.
Figure 8:
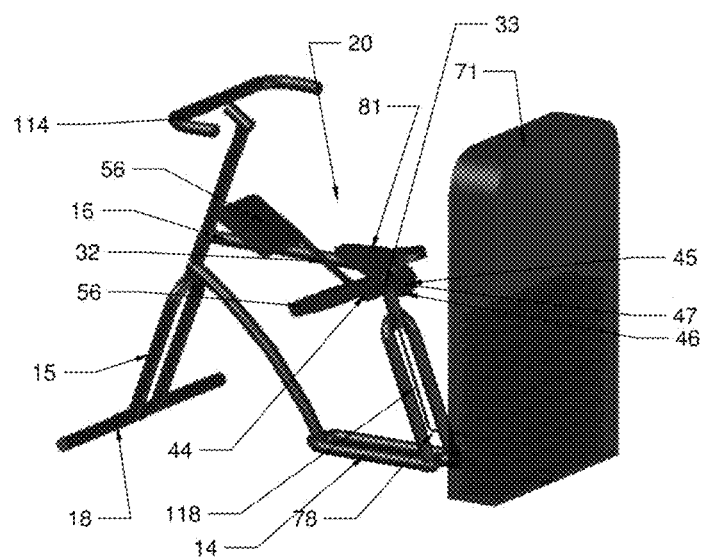
FIG. 8 is a view for describing the exercise device according to another embodiment of the present disclosure to which one set of load blocks is attached as a resistive force generator.
Figure 9:
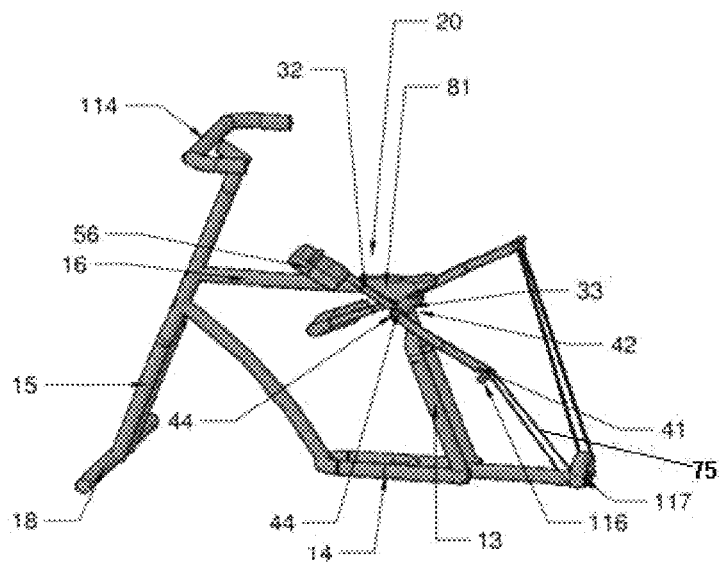
FIG. 9 is a view for describing the exercise device according to another embodiment of the present disclosure to which an elastic body is attached as a resistive force generator.
Figure 10:
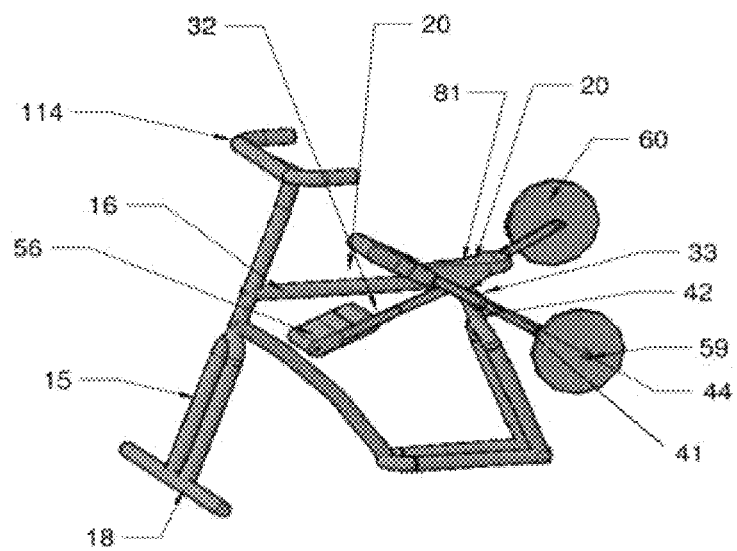
FIG. 10 is a view for describing the exercise device according to another embodiment of the present disclosure to which the disk device is attached as a resistive force generator.

FIGS. 1 and 2 are views respectively illustrating a general hip joint motion range in a sagittal plane and a motion range of a bicycle crank. FIGS. 3, 6, 7, and 8 are views illustrating a state in which an exercise device according to an embodiment of the present disclosure includes a load block 71 as a resistive force generator. FIGS. 4 and 10 are views of the exercise device according to an embodiment of the present disclosure to which a disk device including a disk holder 59 and a disk 60 is attached. FIG. 9 is a side view of the exercise device according to an embodiment of the present disclosure, illustrating a state in which an elastic body 75 is provided as a resistive force generator and a ground strut elastic body fixing portion 117 and an arm portion elastic body holder 116 for fixing the elastic body 75 are attached.

Figure 5:
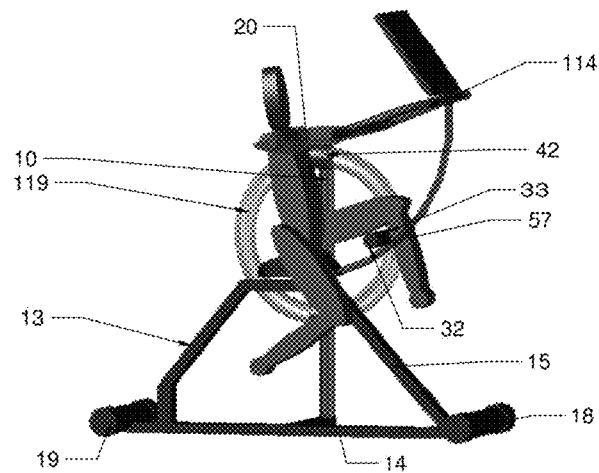
FIG. 5 is a view for describing an exercise device according to an embodiment of the present disclosure implemented as a stationary bicycle.

As shown in FIGS. 3 through 8, the exercise device according to an embodiment of the present disclosure includes a seat 20 configured to support a user in a sitting position, an arm connector 33, a pivot axis 44 of an arm 100 of an arm portion 32 located on a rear lower end of the seat 20 when being seen in a sagittal plane (a plane that divides the body into right and left parts), the arm portion 32 pivotably connected to the arm connector 33, and a thigh pad 56 having a plate shape and rotatably connected to a lower end of the arm portion 32 and placed on the user's thigh. The exercise device according to an embodiment of the present disclosure is to train thigh and hip muscles while protecting the user's knees and ankle joints by enabling the user to locate the thigh pad 56 on his/her thigh in a sitting or lying position on the seat 20 and lower his/her legs and push them backward. The arm connector 33 is provided under a saddle of the seat 20, or is mounted on a frame 10 including a saddle strut 13, a bottom strut 16 and a ground cross strut 14. One or more arm portions 32 and one or more frames 10 may be provided. The frame 10 may be a stationary bicycle-like frame fixed to the ground without wheels as shown in FIG. 5. The exercise device according to an embodiment of the present disclosure may be configured in any of various methods and forms (e.g., the exercise device may include the load block 71 as shown in FIGS. 5, 6, 7, and 8). A detailed configuration is illustrated and will be described in detail.

The exercise device according to an embodiment of the present disclosure includes a resistive force generator configured to generate a resistive force when the arm portion 32 pivots and a connector configured to connect the resistive force generator to the frame 10. For example, as shown in FIGS. 3, 7, and 8, the resistive force generator may include the load block 71. In order to generate a resistive force when the arm portion 32 pivots, as shown in FIG. 16, the load block 71 is connected by a wire 118 (see FIG. 8) to the arm connector 33 including a roller 48 that rotates about the pivot axis 44 when the arm 100 pivots and a roller base 77 that supports and surrounds the roller 48.

Figure 6:
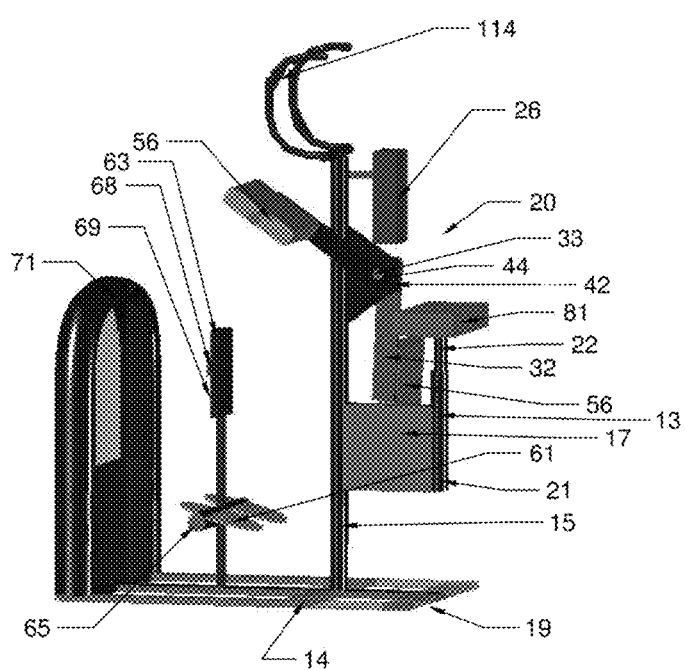
FIG. 6 is a view for describing the exercise device according to another embodiment of the present disclosure to which the load block is attached as a resistive force generator.

Optionally, as shown in FIG. 9, the resistive force generator includes a seat arm connector 41 extending from an end of the arm portion 32, the elastic body 75 configured to generate a resistive force when the arm portion 32 pivots, the arm portion elastic body holder 116 configured to fix one end of the elastic body 75, and the ground strut elastic body fixing portion 117 located behind a rear ground support member 19 and configured to fix the other end of the elastic body 75. Optionally, as shown in FIGS. 4 and 10, the resistive force generator includes the arm connector 33 extending from an upper end of the arm portion 32 along a rotation axis x, a balance maintaining member 49 extending to maintain balance, and the disk holder 59 on which a disk may be placed. One resistive force generator may be provided as shown in FIGS. 3, 6, and 8 or multiple resistive force generators may be provided as shown in FIGS. 4 and 7. In addition, the resistive force generator may generate a resistive force against the pivoting of the arm portion 32. Furthermore, the exercise device according to an embodiment of the present disclosure includes an indoor stationary bicycle in which a cylindrical thigh pad 57 is connected in a ]-shape to a roller or a wheel 119 as shown in FIG. 5.

Figure 16:
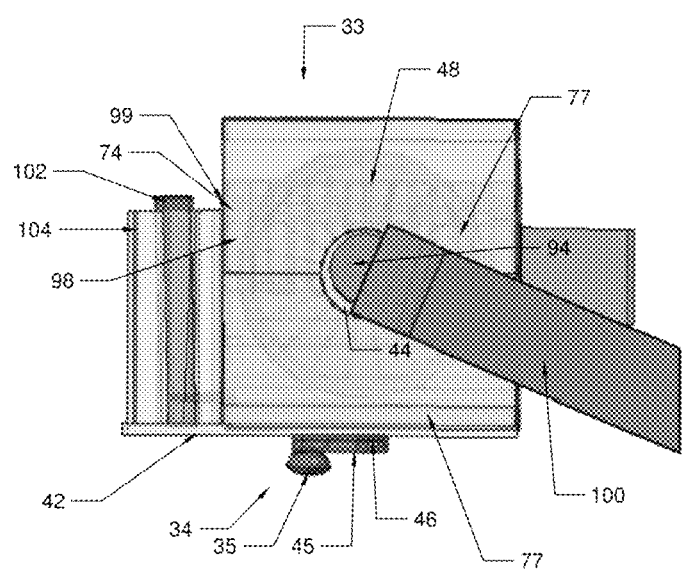
FIG. 16 is a partial view illustrating a state in which the shaft changing device of the present disclosure is changed to be rotatable about the x-axis (parallel to the ground)
Figure 17:
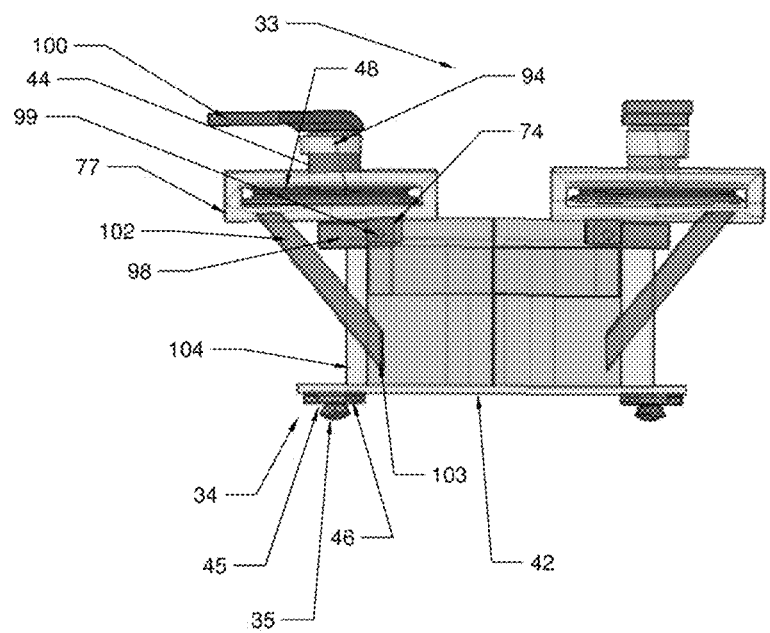
FIG. 17 is a partial view illustrating a state in which the shaft changing device of the present disclosure is changed to be rotatable about the y-axis (perpendicular to the ground)

The exercise device according to another embodiment of the present disclosure includes an arm angle adjustment assembly 34 (see FIG. 11) configured to adjust an open angle between the user's legs as shown in FIGS. 11, 12, 16, 17, and 21. As shown in FIGS. 16 and 17, the arm angle adjustment assembly 34 for adjusting an open angle of the user's legs includes a rotating plate 45 integrally formed with an arm base, a casing 46 integrally formed with an arm fixing portion 42, and an index pin configured to indicate an open angle of the arm. Optionally, the arm angle adjustment assembly 34 may include an arm angle sliding portion 37 (see FIG. 21) sliding into the arm base and may adjust and fix an angle by inserting a bolt into an insertion hole formed in the arm angle sliding portion 37.

Figure 11:
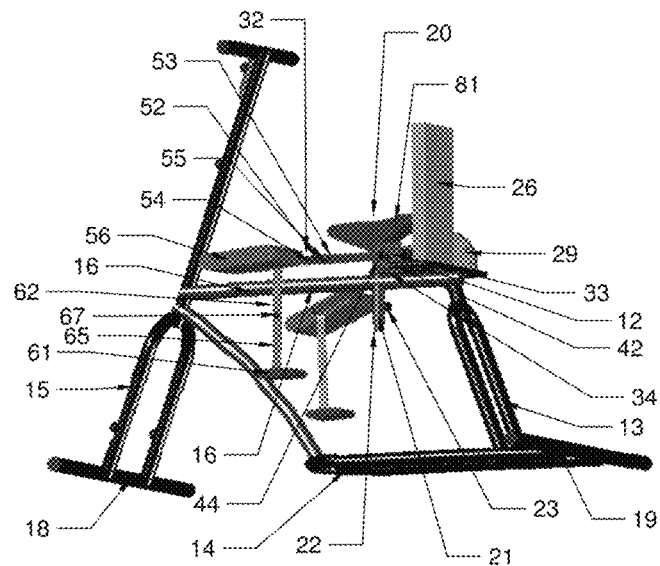
FIG. 11 is a view for describing the exercise device according to another embodiment of the present disclosure to which a shaft changing device is attached to be rotatable about an x-axis (parallel to the ground)
Figure 12:
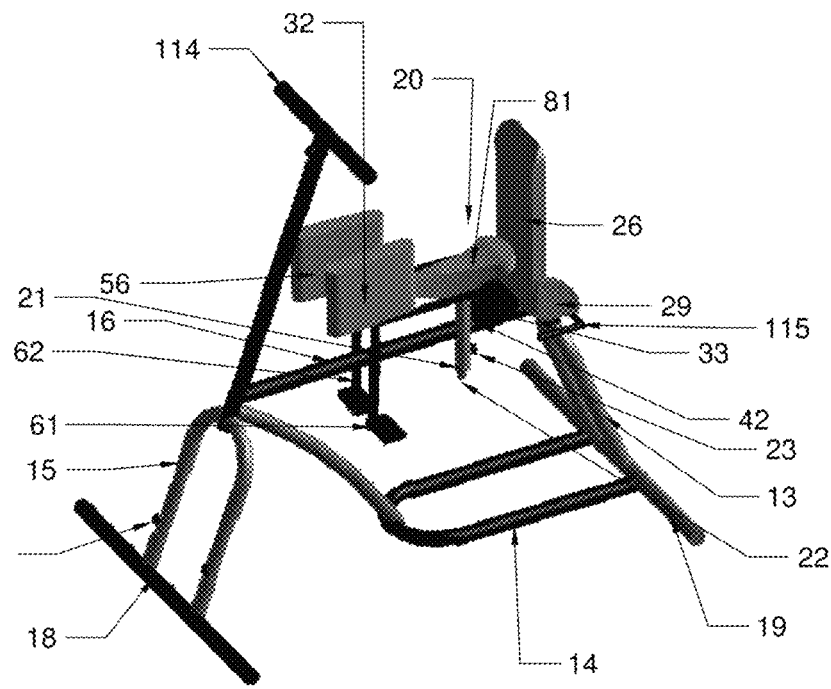
FIG. 12 is a view for describing the exercise device according to another embodiment of the present disclosure to which the shaft changing device is attached to be rotatable about a y-axis (perpendicular to the ground)
Figure 13:
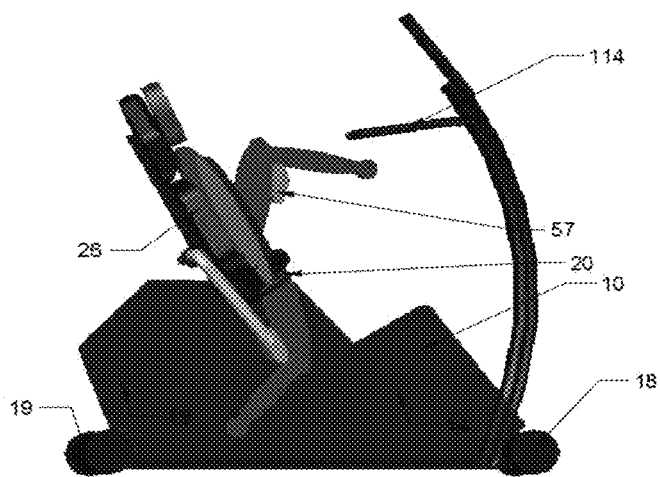
FIG. 13 is a view for describing the exercise device according to another embodiment of the present disclosure implemented as a stationary bicycle.

The exercise device according to an embodiment of the present disclosure includes a foot plate 61 located on a lower end of the frame 10, the seat 20, or the arm portion 32, as shown in FIGS. 4, 6, 7, and 12. As shown in FIG. 12, a foot plate connector 62 pivotably connected to the arm portion 32 and the thigh pad 56 is provided on the foot plate 61. In addition, as shown in FIGS. 6 and 7, the exercise device according to an embodiment of the present disclosure includes, on a lower end of the frame 10, the seat 20, or the arm portion 32, a knee support 63 configured to support the user's knees, a torso support 26 configured to support the user's torso, and a front handle 114 held by the user for postural stability. The exercise device according to an embodiment of the present disclosure illustrated in FIGS. 4, 6, and 7 operates with the user's abdomen leaning on the torso support 26. FIGS. 11, 12, and 13 illustrate the exercise device according to an embodiment of the present disclosure that operates with the user's back leaning on the torso support 26.

Figure 26:
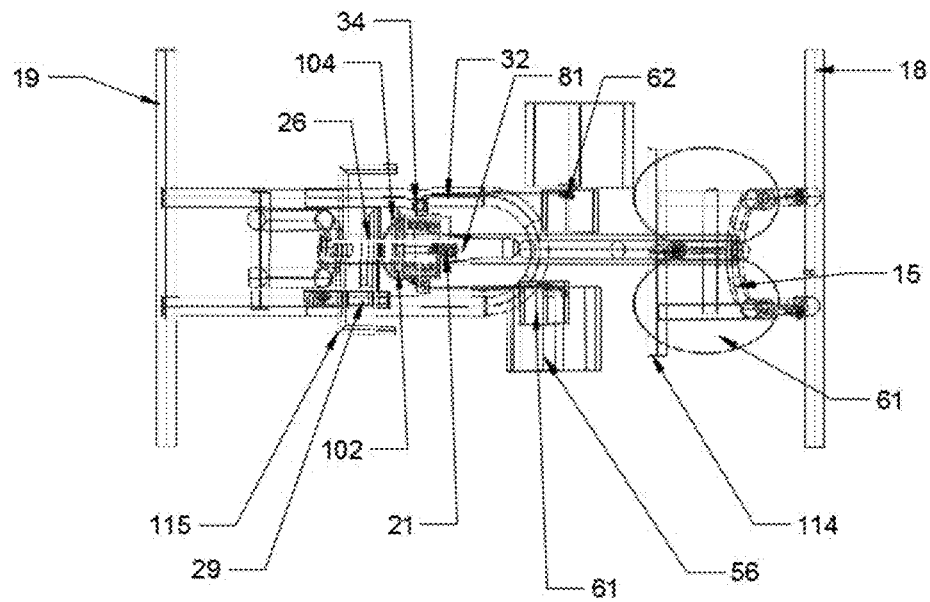
FIG. 26 is a plan view of the exercise device according to another embodiment of the present disclosure implemented as a stationary bicycle and including the shaft changing device.

The exercise device according to an embodiment of the present disclosure includes an angle adjusting member including a casing 35 integrally formed with the arm portion 32 and connected to the arm pivot axis 44 and an angle adjustment plate 36 integrally formed with the arm connector 33 and connected to the frame 10 in order to set a start interval of a motion range of the arm, as shown in FIG. 4. Also, the exercise device according to an embodiment of the present disclosure includes a torso support angle adjustment plate 29 configured to adjust an angle of the torso support 26 for user convenience so that the user may adjust an inclination angle of the user's torso in a lying or sitting position, as shown in FIGS. 11 and 12. The exercise device according to an embodiment of the present disclosure includes an arm length adjusting portion 52 configured to adjust and fix an interval between the arm portion 32 and the seat 20. In order for the user to maintain postural stability when using the exercise device, the exercise device according to an embodiment of the present disclosure includes the front handle 114 (see FIGS. 3 through 15) or a rear handle 115 (see FIGS. 12 and 26) on the frame 10, an upper end support 11, or a lower end of the seat 20.

Figure 18:
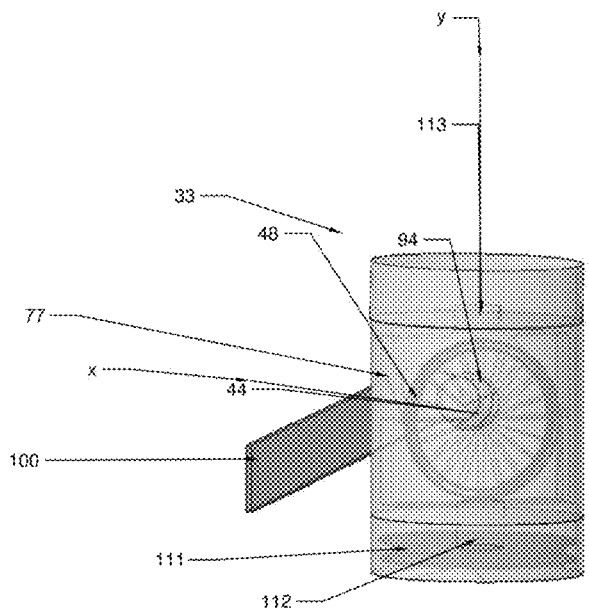
FIG. 18 is a partial view illustrating a state in which two axes are provided on one arm and the arm is rotatable about both the x-axis (parallel to the ground) and the y-axis (perpendicular to the ground) according to the present disclosure.
Figure 19:
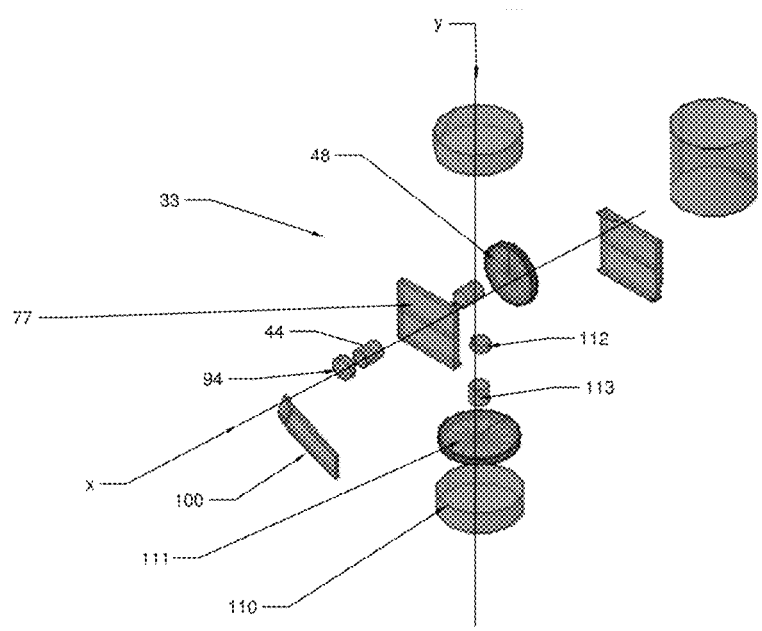
FIG. 19 is an exploded perspective view of the shaft changing device of FIG. 18.
Figure 20:
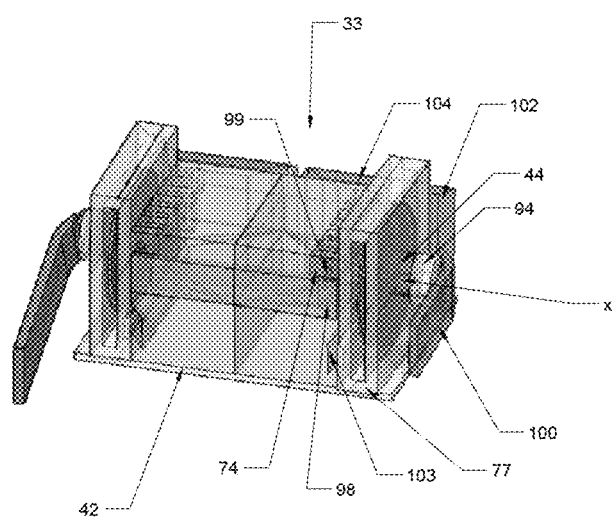
FIG. 20 is a partial perspective view illustrating a state in which the shaft changing device of the present disclosure is changed to be rotatable about the x-axis.
Figure 21:
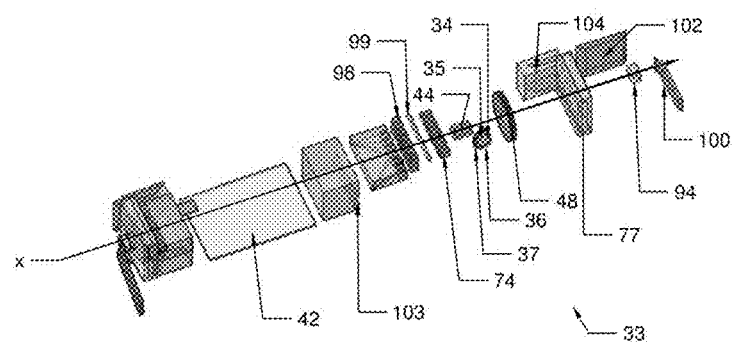
FIG. 21 is an exploded perspective view of the shaft changing device of FIG. 20.

In the exercise device according to an embodiment of the present disclosure, as shown in FIGS. 18 and 19, the arm connector 33 including the roller base 77 (referred to as 'first roller base 77') configured to support rotation of the roller 48 (referred to as 'first roller 48') about an x-axis parallel to the ground includes a second roller 111 perpendicularly intersecting the first roller base 77 and configured to rotate about a second arm pivot axis 113 parallel to a y-axis perpendicular to the ground, a second bearing 112 configured to support rotation of the second roller 111, and a second roller base 110 (see FIG. 19) provided on an end of the first roller base 77 and configured to support rotation of the second roller 111. A rotation axis of the arm portion 32 is on both the y-axis perpendicular to the ground and the x-axis parallel to the ground, and thus the arm rotates in a three-dimensional (3D) space. Accordingly, the user's lower body may rotate in both a plane perpendicular to the ground and a plane parallel to the ground. Furthermore, a position and a direction of the thigh holder may be adjusted according to a motion direction of the user's lower body.

The exercise device according to an embodiment of the present disclosure includes a shaft changing portion, and the first roller base 77 connected to the arm portion 32 is connected by a hinge 74 to the arm connector 33 as shown in FIGS. 12, 16, 20, 21, and 26, and thus when a hinge base 98 pivots about a hinge axis 99 of the hinge 74 and is horizontally located (embodiment of FIG. 17), the pivot axis 44 of the arm portion 32 is placed on the y-axis perpendicular to the ground, and when the hinge base 98 pivots about the hinge axis 99 of the hinge 74 and is vertically located (embodiment of FIG. 16), the pivot axis 44 of the arm portion 32 is placed on the x-axis parallel to the ground. Thus the user may adjust a direction of the pivot axis of the arm portion with respect to the ground in accordance with the user's body part to be trained.

Figure 14:
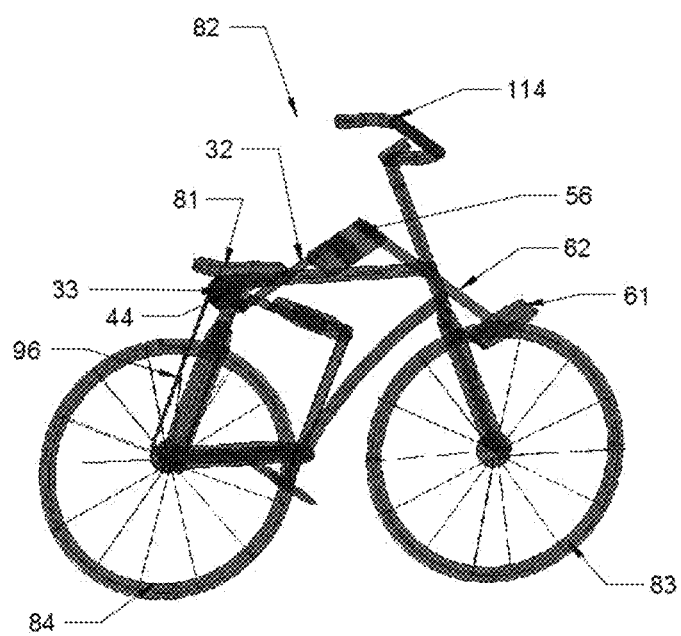
FIG. 14 is a view for describing the exercise device according to another embodiment of the present disclosure implemented as a moving bicycle.
Figure 15:
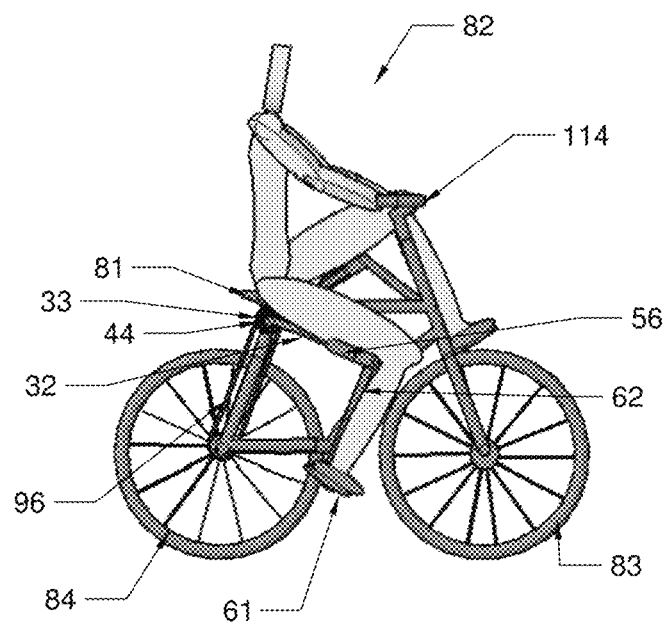
FIG. 15 is a view illustrating a state in which the exercise device of FIG. 14 is used.
Figure 22:
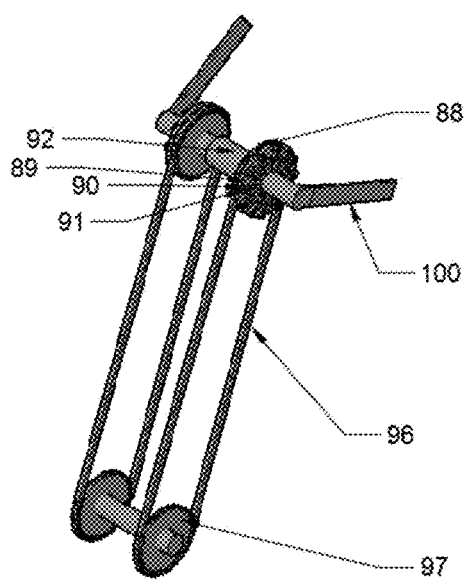
FIG. 22 is a partial view of a propelling member of the exercise device according to another embodiment of the present disclosure implemented as a bicycle.

In the exercise device according to an embodiment of the present disclosure, as shown in FIGS. 14 and 15, the pivot axis 44 of the arm portion 32, when being seen in a sagittal plane, is located vertically within 20 cm and horizontally within 20 cm from the front and back of the user's hip joints on the seat 20. The thigh pad 56 having a plate shape is rotatably connected to a lower end portion of the arm portion 32 and is placed on the user's thigh. As shown in FIG. 22, the exercise device according to an embodiment of the present disclosure implemented as a bicycle includes a series of driving force transmitting portions located on an end of the arm portion 32 or an end of the thigh pad 56 and configured to transmit a driving force to a driving wheel of the bicycle. A knee support configured to fix and support the user's knees may be provided.

The exercise device according to an embodiment of the present disclosure implemented as a bicycle 82 includes a propelling member configured to propel the bicycle 82 by rotating when the arm portion 32 rotates clockwise and idling when the arm portion 32 rotates counterclockwise to drive a rear wheel.

As shown in FIG. 22, the propelling member includes a propelling device connected to the pivot axis and a driven sprocket 97 provided on a side of a rear wheel on a rotation axis of the rear wheel, and a chain 96 connected to the propelling member and the driven sprocket 97.

Figure 23:
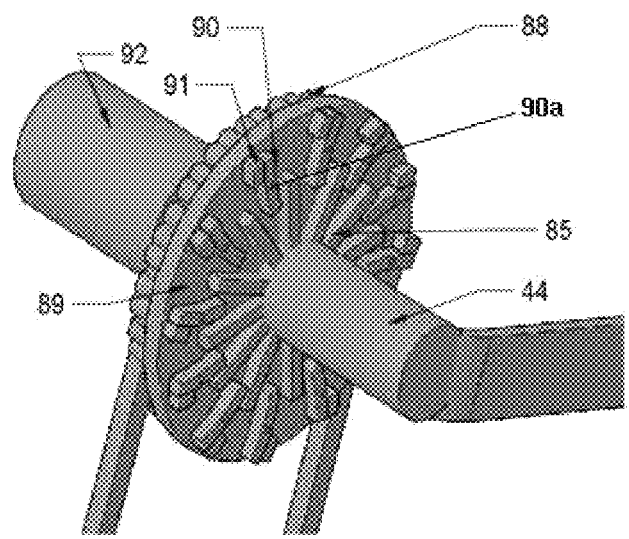
FIG. 23 is a partial enlarged view of the propelling member of the exercise device according to another embodiment of the present disclosure implemented as a bicycle.

An embodiment of the propelling member includes, as illustrated in FIGS. 22 and 23, a pivot axis free wheel 85 coupled to the pivot axis 44, a roller 89 coupled to a surface of a driving sprocket 88, a roller contact bar 90 provided on a surface of the roller 89 to be pivotable about a rotation axis 90a, and a stopper 91 located outside a radial direction of the roller 89 about the rotation axis 90a of the roller contact bar 90 to be misaligned with the rotation axis 90a of the roller contact bar 90 and configured to prevent the roller contact bar 90 from rotating by a predetermined angle or more. When the pivot axis free wheel 85 coupled to the pivot axis 44 rotates counterclockwise, the roller contact bar 90 pivotably provided on the roller 89 coupled to the driving sprocket 88 rotates clockwise about the rotation axis 90a, and the driving sprocket 88 coupled to the roller 89 idles because a pivoting force of the pivot axis free wheel 85 is not transmitted to the driving sprocket 88 coupled to the roller 89. In contrast, when the pivot axis free wheel 85 coupled to the pivot axis 44 rotates clockwise, although a force is applied to rotate the roller contact bar 90, pivotably provided on the roller 89 coupled to the driving sprocket 88, counterclockwise about the rotation axis 90a, the stopper 91 that is located adjacent to the roller contact bar 90 blocks additional rotation of the roller contact bar 90 to prevent the roller contact bar 90 from further rotating, and thus the roller 89 rotates and the driving sprocket 88 connected to the roller 89 also rotates.

Figure 24:
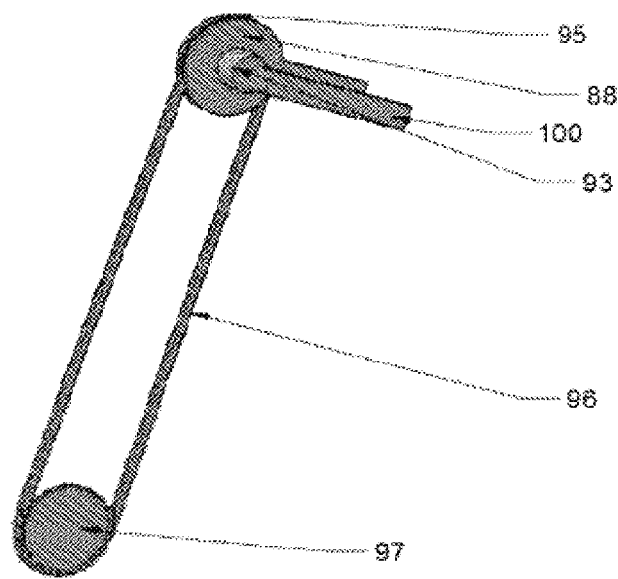
FIG. 24 is a partial enlarged view of the propelling member of the exercise device according to another embodiment of the present disclosure implemented as a bicycle.
Figure 25:
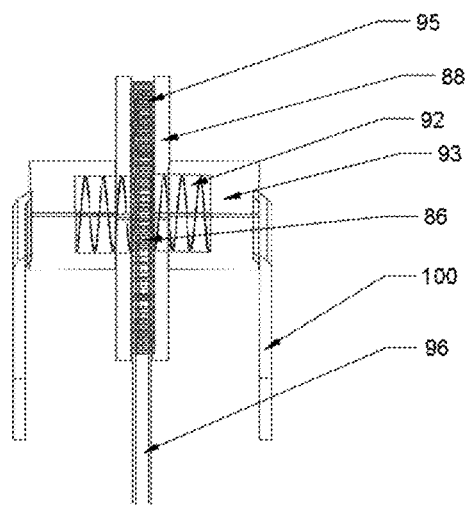
FIG. 25 is a plan view of the propelling member of the exercise device according to another embodiment of the present disclosure implemented as a bicycle.

As shown in FIGS. 24 and 25, another embodiment of the propelling member included in the exercise device according to an embodiment of the present disclosure includes the pivot axis 44 having an outer circumferential surface on which a screw thread is formed, the driving sprocket 88 provided on the pivot axis 44 and allowing the chain 96 to be connected thereto, a driving sprocket wheel 95 integrally fixed to a spindle 92 coupled to the pivot axis 44, a three side contact free wheel 86 screwed onto a side of the spindle 92 at a side of the driving sprocket 88 on the pivot axis 44 and configured to idle about the pivot axis 44 during counterclockwise rotation and rotate along with the driving sprocket wheel 95 during clockwise rotation, a bearing 94 (see FIGS. 19 and 21) having a horizontal cylindrical shape and located on a central portion of a side surface of the pivot axis 44 of the arm portion, and a propelling member base 93 coupled to a central axis of the bearing 94 and having a cut hole into which the three side contact free wheel 86 is inserted.

I claim:

1. An exercise device for exercising upper leg portions and hips while protecting knee and ankle joints, the exercise device comprising:
    a frame;
    an arm connector connected to the frame;
    a seat connected to the frame and configured to support a user in a sitting or lying position;
    an arm pivotably connected to the arm connector;
    a thigh pad pivotably connected to an end of the arm portion and configured to contact the user's thigh during use;
    wherein the exercise device is configured to allow the user to sit or lie on the seat, place the user's thigh on the thigh pad, and move the thigh of the user backward from an exercise starting position where the thigh is pulled toward the user's chest such that the user's thigh moves during exercises and the user flexes the hip while exercising;
    further comprising an arm angle adjustment assembly configured to set an open angle of the user's leg.

2. An exercise device for exercising upper leg portions and hips while protecting knee and ankle joints, the exercise device comprising:
    a frame;
    an arm connector connected to the frame;
    a seat connected to the frame and configured to support a user in a sitting or lying position;
    an arm pivotably connected to the arm connector;
    a thigh pad pivotably connected to an end of the arm and configured to contact the user's thigh during use;
    wherein the exercise device is configured to allow the user to sit or lie on the seat, place the user's thigh on the thigh pad, and move the thigh of the user backward from an exercise starting position where the thigh is pulled toward the user's chest such that the user's thigh moves during exercises and the user flexes the hip while exercising;
    a handle extending from and connected to a lower end of the seat or the frame;
    a shaft changing portion configured to change a pivot axis of the arm between an x-axis direction parallel to the ground and a y-axis direction perpendicular to the ground.

3. An exercise device for exercising upper leg portions and hips while protecting knee and ankle joints, the exercise device comprising:
    a frame;
    a seat connected to the frame and configured to support a user in a sitting or lying position;
    an arm pivotably connected to the frame and rotatable;
    a thigh pad pivotably connected to a lower end of the arm and configured to contact the user's thigh during use;
    wherein the exercise device is configured to allow the user to sit on the seat to have the sitting position, place the user's thigh on the thigh pad, and move the thigh of the user backward from an exercise starting position where the thigh is pulled toward the user's chest such that the user's thigh moves during exercises and the user flexes the hip while exercising;

wherein the exercise device is a bicycle.

4. The exercise device of claim 3, wherein the exercise device further comprises a propelling member configured to drive a rear wheel by rotating when the arm rotates in a first direction and idling when the arm rotates in a second direction opposite to the first direction.

5. The exercise device of claim 3, wherein an arm pivot axis is on a rear end of the seat.

* * * * *